(12) United States Patent
Sic et al.

(10) Patent No.: US 7,210,446 B2
(45) Date of Patent: May 1, 2007

(54) V-TWIN CONFIGURATION HAVING ROTARY MECHANICAL FIELD ASSEMBLY

(76) Inventors: Tihomir Sic, 24000 Subotica Igmanska 14, Serbia-Montenegro (YU); Miladin Vidakovic, 2400 Subotica Tamiska 18, Serbia-Montenegro (YU)

( * ) Notice: Subject to any disclaimer, the term of this patent is extended or adjusted under 35 U.S.C. 154(b) by 0 days.

(21) Appl. No.: 10/959,883

(22) Filed: Oct. 5, 2004

(65) Prior Publication Data

US 2005/0066930 A1    Mar. 31, 2005

Related U.S. Application Data

(63) Continuation-in-part of application No. 10/858,939, filed on Jun. 2, 2004.

(30) Foreign Application Priority Data

Apr. 7, 2004   (YU) .................................. 292/2004

(51) Int. Cl.
F02B 25/04    (2006.01)
(52) U.S. Cl. ................. 123/197.4; 123/197.1
(58) Field of Classification Search ............. 123/197.4, 123/197.1
See application file for complete search history.

(56) References Cited

U.S. PATENT DOCUMENTS

| | | | |
|---|---|---|---|
| 723,071 A | 3/1903 | Thiery | |
| 4,395,977 A | 8/1983 | Pahis | |
| 5,431,130 A | 7/1995 | Brackett | |
| 5,884,590 A | 3/1999 | Minculescu | |
| 6,009,845 A * | 1/2000 | Ehrlich | 123/197.4 |
| 6,202,623 B1 * | 3/2001 | Ehrlich | 123/197.4 |
| 6,234,138 B1 * | 5/2001 | Cathey | 123/197.4 |
| 6,349,694 B1 * | 2/2002 | Babington | 123/197.1 |
| 6,701,885 B2 * | 3/2004 | Klomp et al. | 123/197.4 |
| 6,789,515 B1 * | 9/2004 | Marchisseau | 123/78 C |
| 6,820,586 B2 * | 11/2004 | Watanabe | 123/197.1 |

FOREIGN PATENT DOCUMENTS

| | | |
|---|---|---|
| DE | 2950188 | 6/1981 |
| EP | 1074724 | 2/2001 |
| EP | 1207287 | 5/2002 |
| FR | 2581702 | 11/1986 |
| WO | WO 2004/061270 | 7/2004 |

* cited by examiner

Primary Examiner—Stephen K. Cronin
Assistant Examiner—Jason Benton
(74) Attorney, Agent, or Firm—Foley & Lardner, LLP

(57) ABSTRACT

An engine having a rotary member and a first linear member includes a first axis about which the rotary member rotates and a second axis coupling the rotary member to an offset rotary element. The first linear member is coupled to the offset rotary element by a first coupling. The second linear member is coupled at one end to the offset rotary element by the first coupling and at an opposite end to a housing. The first linear member moves back and forth in lateral fashion from a first position to a second position. The lateral movement of the first linear member causing continuous rotational movement of the rotary member in one direction.

15 Claims, 15 Drawing Sheets

V-TWIN CONFIGURATION HAVING ROTARY MECHANICAL FIELD ASSEMBLY

CROSS-REFERENCE TO RELATED APPLICATIONS

The present application is a continuation-in-part application of U.S. patent application Ser. No. 10/858,939 entitled "Rotary Mechanical Field Assembly," filed on Jun. 2, 2004, by the same inventors as the present application

BACKGROUND OF THE INVENTION

1. Field of the Invention

The present invention relates generally to internal combustion engines. More particularly, the present invention relates to a rotary mechanical field assembly in which linear force is transferred into rotational energy.

2. Description of the Related Art

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the claims in this application and is not admitted to be prior art by inclusion in this section.

An internal combustion engine creates force by burning fuel and air. In general, internal combustion engines or "engines" have two assemblies—the engine head and the engine block. The head of conventional engines typically includes an intake valve that opens and closes an intake port and an exhaust value that opens and closes an exhaust port. The block of conventional engines generally includes a crankshaft which is turned by a piston as the piston moves up and down in a cylinder that connects the engine head and block. In operation, the intake valve opens to allow a fuel and air mixture to enter an explosion chamber in the cylinder with a piston forming the floor of the chamber. An explosion of the fuel and air is created by a spark from a spark plug. This explosion causes the piston in the chamber to move downward and rotate the crankshaft in the engine block. The exhaust value opens and allows the exhaust from the explosion to escape as the piston returns to its position in the chamber before the explosion, helping to push the exhaust through the exhaust valve.

The block of the engine and the housing of the crankshaft are usually assembled in one casting. The camshaft, which operates the valves, can be located in the head or the block. In engines cooled with water, the head and the block of the engine have ducts for the cooling water. Generally, the pistons are connected by piston rods with the crankshaft that is rotating. The crankshaft has a fixed location to ensure uniformity of the rotation of the engine. The bottom of the engine at the lower end of the housing of the crankshaft serves for the placement of oil for lubrication.

Many different types of combustion engines have been developed. For example, an Otto engine utilizes a four-stroke approach (known as the Otto cycle in honor of Nikolaus Otto, who invented it in 1867). The Otto engine prepares fuel and air for burning outside of the cylinder using a carburetor, which mixes the correct amount of fuel and air. Another type of engine is a diesel engine (also named after its inventor, Rudolf Diesel). Diesel engines do not have spark plugs, rather a diesel engine compresses air and injects fuel into the compressed air. The heat of the compressed air lights the fuel spontaneously. A third type of engine is the Wankel engine or Wankel rotary engine (named after Felix Wankel). Instead of moving a piston up and down, the Wankel engine rotates a triangular rotor. The force to move the rotor comes from a combustion of fuel and air contained in a chamber formed by part of the housing and one face of the triangular rotor.

Modern engines can also be classified by how the fuel and air are provided and the exhaust is removed. A "four-stroke engine" has two valves for each cylinder—a suction valve and an exhaust valve. During the first stroke, the piston moves from an upper portion of the cylinder towards the bottom. The increased space in the cylinder (from the movement of the piston) creates a force that pushes the fuel and air mixture out of the carburetor into the explosion chamber. During the second stroke, the piston moves from the bottom portion of the cylinder towards the top. The piston compresses the fuel and air mixture in the cylinder because the valves are closed. In the third stroke, the mixture is ignited by a spark in the spark plug. The mixture burns, increasing the temperature and the pressure. This pressure from the burning process pushes the piston from the upper to the lower portion of the cylinder, exerting a force to rotate the crankshaft. In the fourth stroke, the burned gases are exhausted out through an opened exhaust valve. The piston moves from the bottom towards the upper portion of the cylinder, pushing the remnants of burned gasses from the cylinder. The process then repeats itself.

In a "two-stroke engine," the filling and emptying of the cylinder happens during one part of the rotation of the crankshaft. Instead of suction and exhaust valves, the two-stroke engine has openings on the cylinder liner which are closed and opened by movement of the piston. Typically, the exhaust opening is located closer to the top of the cylinder than the intake opening. When the piston is moving up it creates pressure to push exhaust out the exhaust opening. Before the piston reaches the top of its movement in the cylinder, it covers over the exhaust creating pressure in the explosion chamber for the combustion to occur. When the piston is moving down, it uncovers the intake opening and acts as a pump to move the fuel and air mixture into the chamber.

Engines can also be categorized according to the position of the cylinders. Examples of engines with cylinders located in different positions are sequence or "in-line" engines, V-engines, rotation engines, and boxer engines. Sequence engine cylinders are placed one cylinder after another in a row. As a result, working strokes overlap, ensuring uniformity in the drive of the crankshaft. V-engine cylinders are placed in two lines set at an angle to each other. Thus, crankshafts for V-engines can be shorter than those for sequence engines. As discussed above, rotation engines, like the Wankel engine, do not have pistons that move in up-and-down fashion; rather the pistons are rotors formed in the shape of a triangle. In the first stroke of a rotation engine, the rotor rotates to open the intake opening, which allows a fuel and air mixture to enter a chamber. As the rotor rotates in a second stroke, the volume of the chamber decreases and the mixture is compressed. In a third stroke, a spark from the spark plug ignites the mixture. Burned gasses are spread and set the rotor in motion. The volume of the chamber again increases. In a fourth stroke, the first gasket of the chamber slides ahead along the exhaustion opening, opening it for the burned gasses to escape.

Boxer engine cylinders are flat in that they are located 180 degrees from each other. The crankshaft can be shorter than the crankshaft of the sequence engine, and in four cylinder engines, boxer engines only need three standing bearings. In a boxer engine with four cylinders, there is ignition on each half rotation of the crankshaft. Boxer engines are characterized by uniform flow of the rotary momentum, enabling a quiet workflow, because movement on one side of the engine levels with the movement on the other side.

Despite various advancements that have been made heretofore in engine technology, it would be desirable to improve conventional engines, such as the engines described above. For example, it would be desirable to reduce the sound volume produced by engines and to reduce the consumption of fuel needed. Moreover, it would be desirable to produce high power engines with a wide range of uses. Yet still further, it would be desirable to increase the engine's power and momentum.

SUMMARY OF THE INVENTION

In general, exemplary embodiments described herein relate to a rotary mechanical field assembly in which linear force is transferred to rotational energy. An exemplary embodiment relates to an engine having a rotary member and a first linear member. The rotary member includes a first axis about which the rotary member rotates and a second axis coupling the rotary member to an offset rotary element. The first linear member is coupled to the offset rotary element by a first coupling. The second linear member is coupled at one end to the offset rotary element by the first coupling and at an opposite end to a housing. The first linear member moves back and forth in lateral fashion from a first position to a second position. The lateral movement of the first linear member causes continuous rotational movement of the rotary member in one direction.

Another exemplary embodiment relates to a connection that couples linearly moving objects to circularly moving objects. The connection includes a first connector coupling a first linearly moving object to a circularly moving object at a first distance from an axis of the circularly moving object and a second connector coupling the circularly moving object to a housing. The second connector and the first connector are coupled to the circularly moving object at a common location on the circularly moving object.

Another exemplary embodiment relates to an assembly that converts linear motion to rotational motion. The assembly includes a first linear component that moves in a first linear direction when acted upon by a first force, a rotary component that moves in a rotary direction when the first linear component moves linearly. The rotary component includes an offset rotary element rotatably connected to the rotary component. The offset rotary element is coupled to the first linear component by an axis point as to cause the rotary component to move in a continuous rotary direction despite a change in direction by the first linear component. The assembly also includes a balance component coupled to the offset rotary component at the axis point. The balance component does not move in a linear direction but pivots about a point on a housing as the offset rotary component moves.

Yet another exemplary embodiment relates to a system for transferring linear motion into rotational motion. The system includes a piston moving linearly and a wheel having a rotating disc rotatably connected to one side of the wheel. The rotating disc is coupled to the piston by an axis point located a first distance from a center point of the rotating disc, such that the rotating disc moves as a result of the movement of the piston, and the movement of the rotating disc causes the wheel to rotate.

DETAILED DESCRIPTION OF EXEMPLARY EMBODIMENTS

Figure 1:
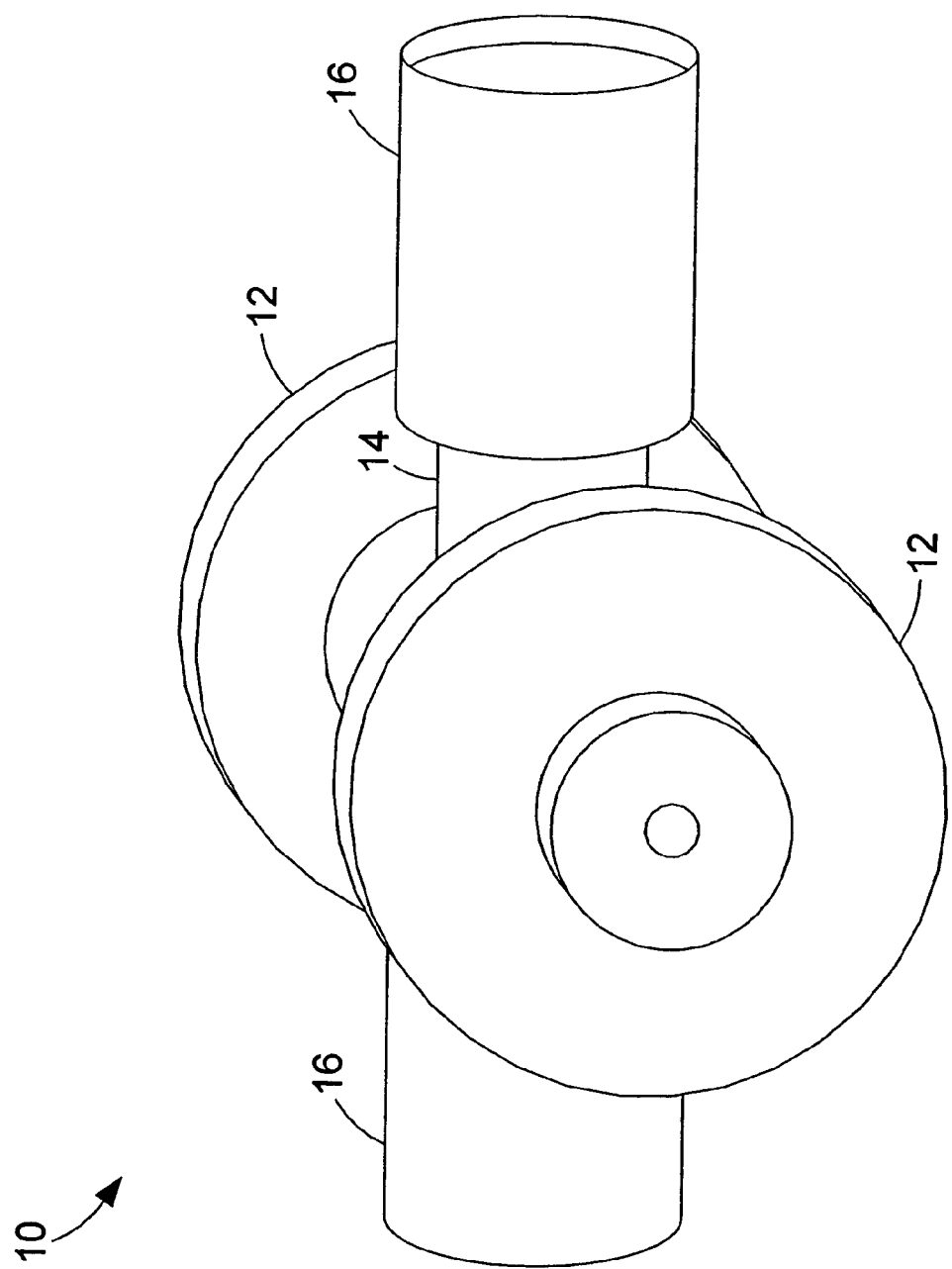
FIG. 1 is a general perspective view diagram of an engine in accordance with an exemplary embodiment.
Figure 2:
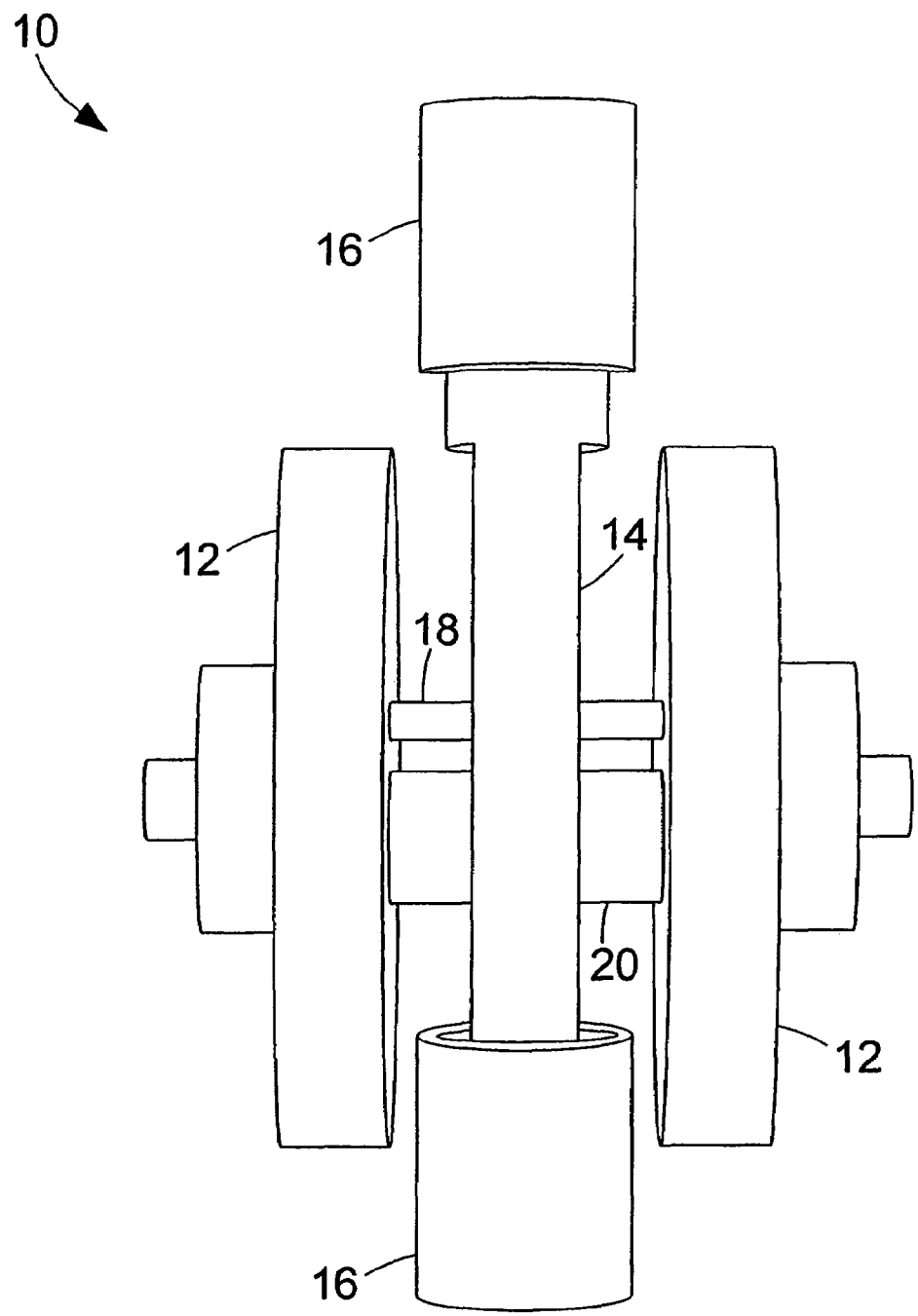
FIG. 2 is a general top view diagram of the engine of FIG. 1.

FIG. 1 illustrates a portion 10 of an engine having rotary members 12, a piston 14, and cylinder heads 16. The piston 14 is located between rotary members 12. The cylinder heads 16 are located at distal ends of the piston 14. The cylinder heads 16 can include engine head components, such as a carburetor, intake value, exhaust value, and other components described in the discussion of the related art above. As shown in FIG. 2, the rotary members 12 are coupled to the piston 14 by a connector 18 and a connector 20.

In operation, combustion of fuel and air occurs in one of the cylinder heads 16. This combustion creates a force on the piston 14 to move it laterally towards the other one of the cylinder heads 16. A combustion of fuel and air occurs in the other one of the cylinder heads 16 and forces the piston 14 back toward the original one of the cylinder heads 16. The timing of the combustions at either end of the piston 14 can be coordinated by a timing circuit. As a result of timed ignitions in the cylinder heads 16, the piston 14 is moved laterally back and forth. This lateral movement of the piston 14 is translated into rotary motion of the rotary members 12 connected by the piston 14 by connectors 18 and 20.

Figure 3:
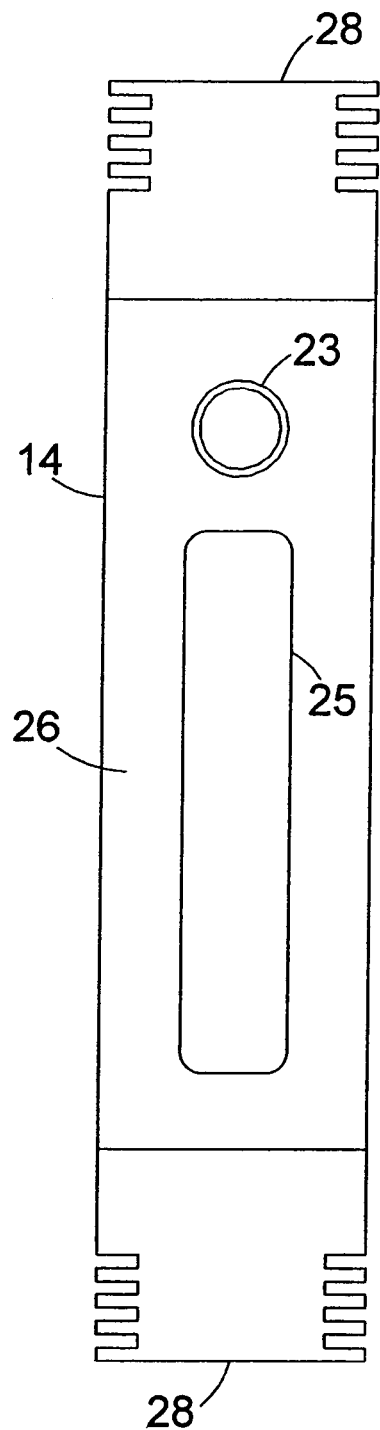
FIG. 3 is a side view diagram of a piston used in the engine of FIG. 1.
Figure 4:
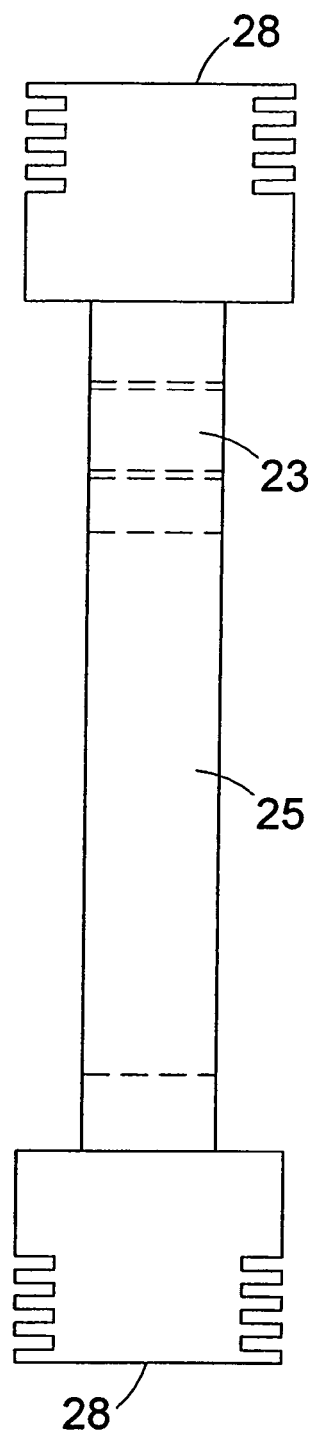
FIG. 4 is a top view diagram of the piston of FIG. 3.

FIG. 3 illustrates the piston 14, including a circular aperture 23 and a rectangular aperture 25. The connector 18 coupling the piston 14 and the rotary members 12 is located in a fixed position within the circular aperture 23. The connector 20 that also couples the piston 14 and the rotary members 12 is located within the rectangular aperture 25. The portion of connector 20 located within the rectangular aperture 25 is not in a fixed position. As shown in FIG. 4, in one embodiment, the piston 14 has a flat section 26 and cylindrical sections 28. The cylindrical sections 28 are configured to fit within the cylinder heads 16 described with reference to FIGS. 1 and 2. Other configurations of the piston 14 can also be utilized.

Figure 5:
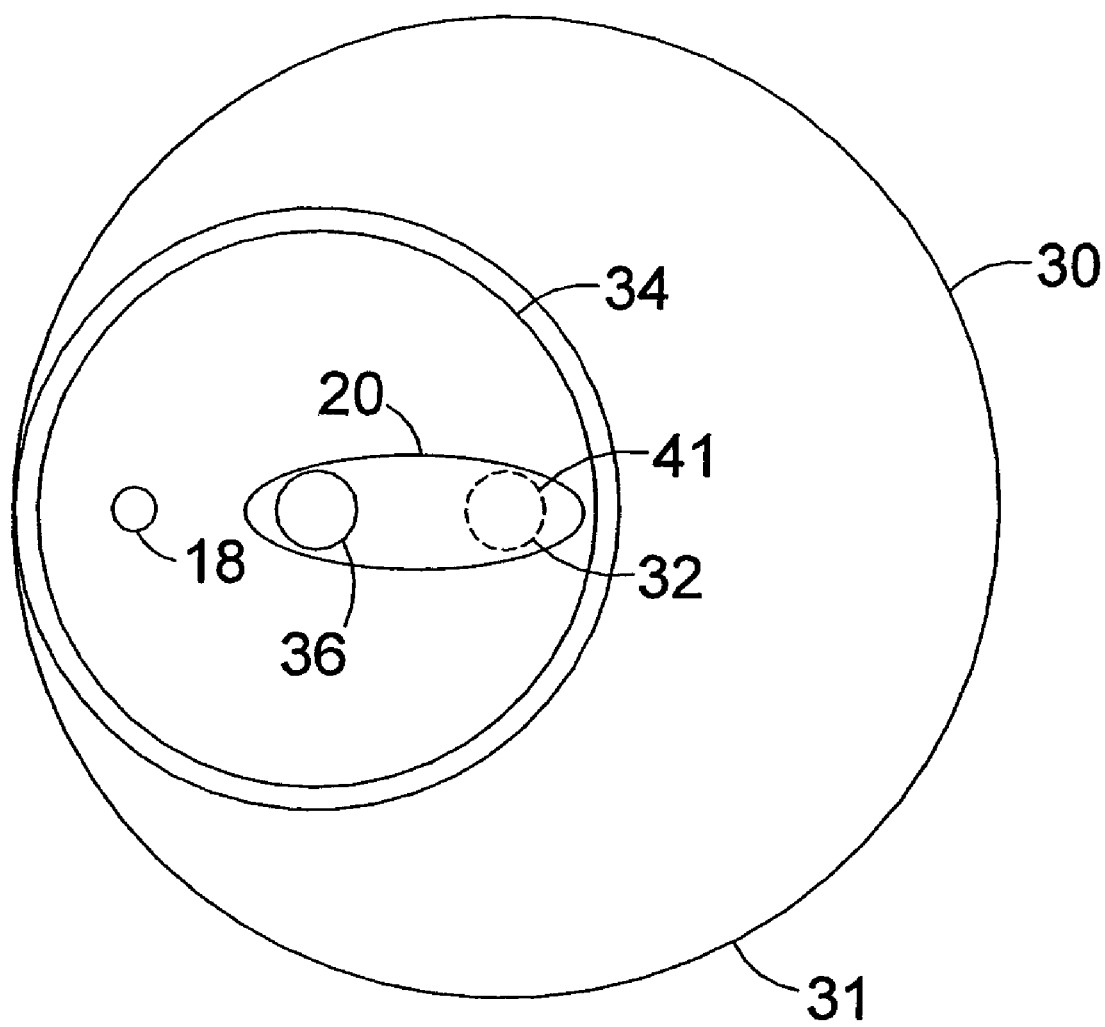
FIG. 5 is a side view diagram of a rotary member of the engine of FIG. 1.

FIG. 5 illustrates a rotary member assembly providing details of the construction of the rotary members 12 according to an exemplary embodiment. The rotary member assembly includes a main disc 31, a first axis 32, and an inset disc 34 which is offset from the first axis 32. The inset disc 34 is positioned in a cut out section of the main disc 31 and rotates about a second axis 36. In an alternative embodiment, the inset disc 34 is not inside a cut out of the main disc 31 but is coupled to the surface of the main disc 31. The embodiment with the inset disc 34 is generally preferred to achieve a balance of masses in the assembly. The connector 18 shown in FIGS. 1 and 2 coupling the piston 14 to the rotary members 12 is attached to the inset disc 34 at a distance from the axis of the inset disc 34 (second axis 36). The connector 20 shown in FIGS. 1 and 2 passes through the aperture 25 of the piston 14 and attaches to the inset disc 34 at the second axis 36. The connector 20 includes a cross bar 41 described with reference to FIGS. 10–12. The cross bar 41 is located in the same plane as the axis of the main disc 31.

Figure 6:
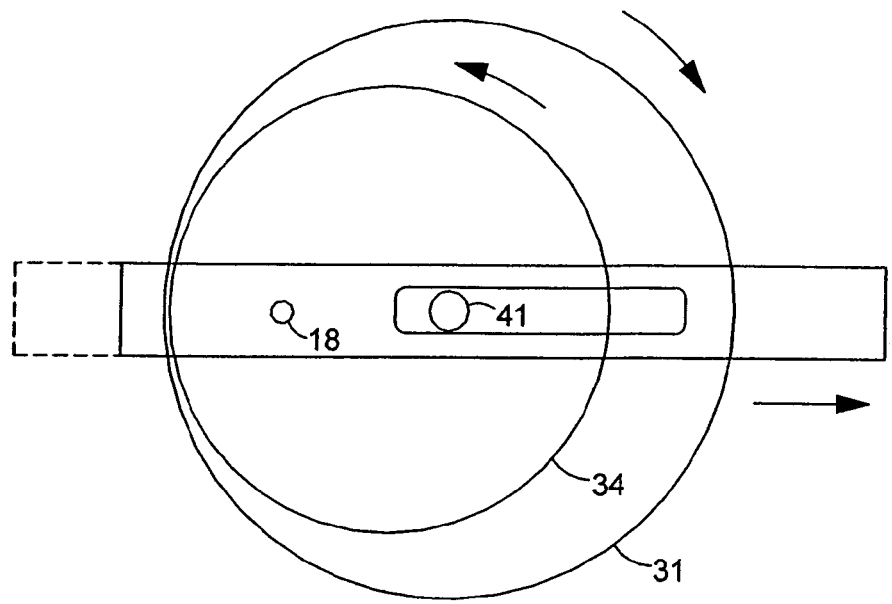
FIG. 6 is a cut-out side view diagram of the piston and rotary member of the engine of FIG. 1 at a first position.
Figure 7:
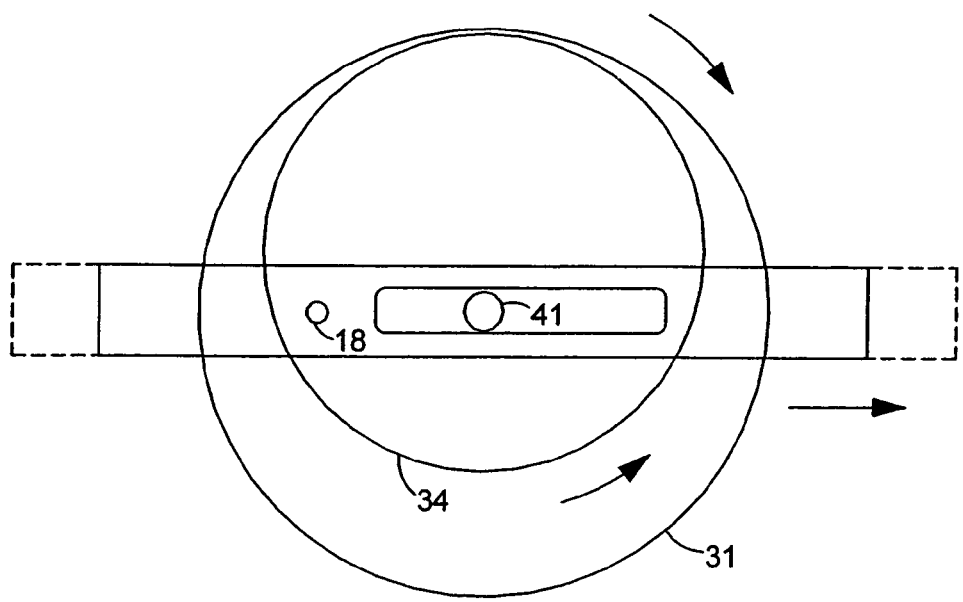
FIG. 7 is a cut-out side view diagram of the piston and rotary member of the engine of FIG. 1 at a second position.
Figure 8:
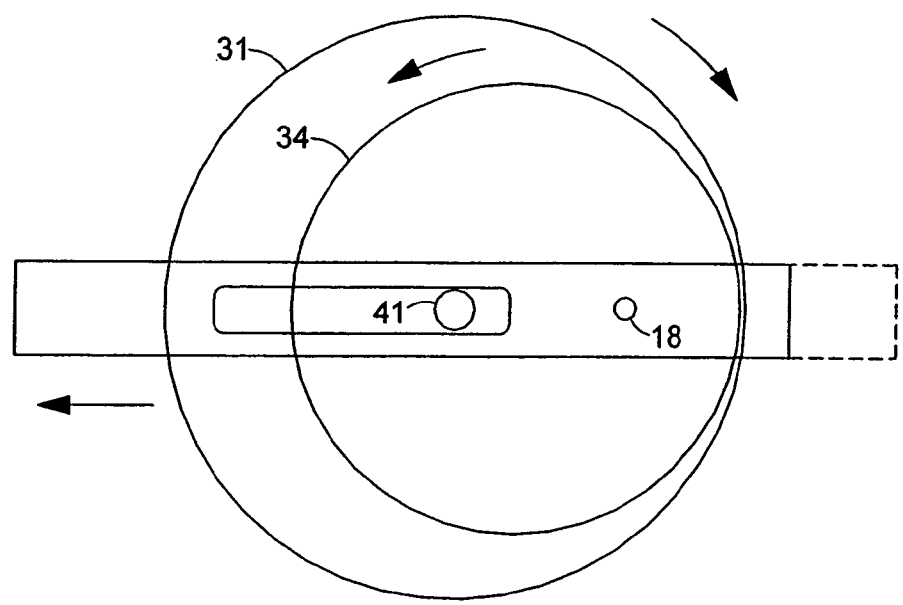
FIG. 8 is a cut-out side view diagram of the piston and rotary member of the engine of FIG. 1 at a third position.
Figure 9:
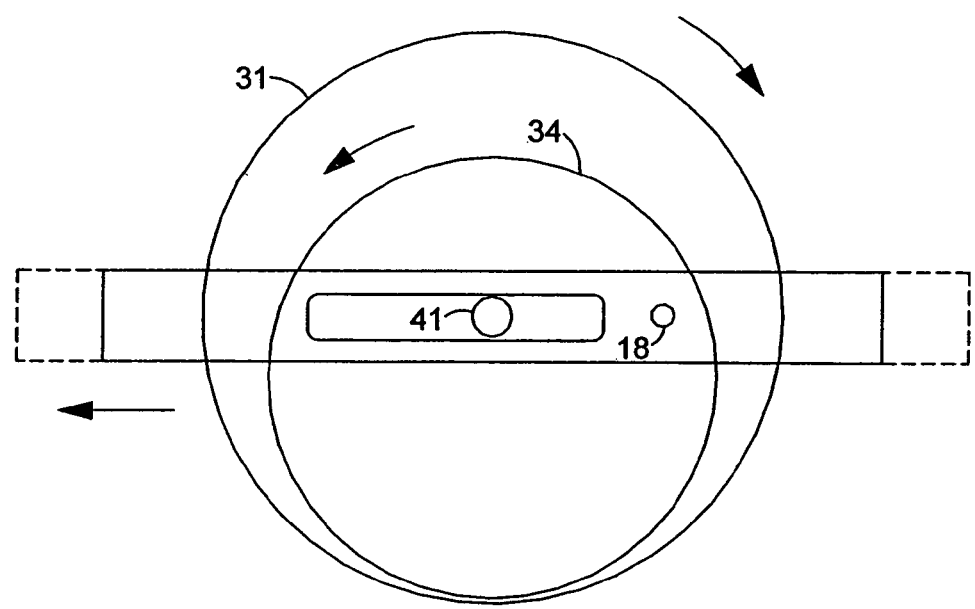
FIG. 9 is a cut-out side view diagram of the piston and rotary member of the engine of FIG. 1 at a fourth position.

FIGS. 6–9 illustrate the movement of the rotary member assembly as the piston 14 moves. In FIG. 6, the piston 14 is at its left-most position, which is the point at which a fuel and air explosion is created from a spark in the left cylinder, forcing the piston 14 toward the right. The inset disc 34 is positioned on the left of the main disc 31 with respect to the piston 14. In FIG. 7, the piston 14 is located at a middle point. The main disc 31 has moved in a clock-wise direction while the inset disc 34 has moved in a counter-clock wise direction. The inset disc 34 is positioned at the top of the main disc 31 with respect to the piston 14. In FIG. 8, the piston 14 is at its right-most position, which is the point at which a fuel and air explosion is created from a spark in the right cylinder, forcing the piston 14 toward the left. The inset disc 34 is positioned on the right of the main disc 31 with respect to the piston 14. In FIG. 9, the piston 14 is located at a middle point. The main disc 31 moves in a clock-wise direction while the inset disc 34 continues to move in a counter-clock wise direction. The inset disc 34 is positioned at the bottom of the main disc 31 with respect to the piston 14. The rotary member assembly continues to move in this fashion as the piston 14 moves laterally back and forth between the two cylinders heads 16.

Figure 10:
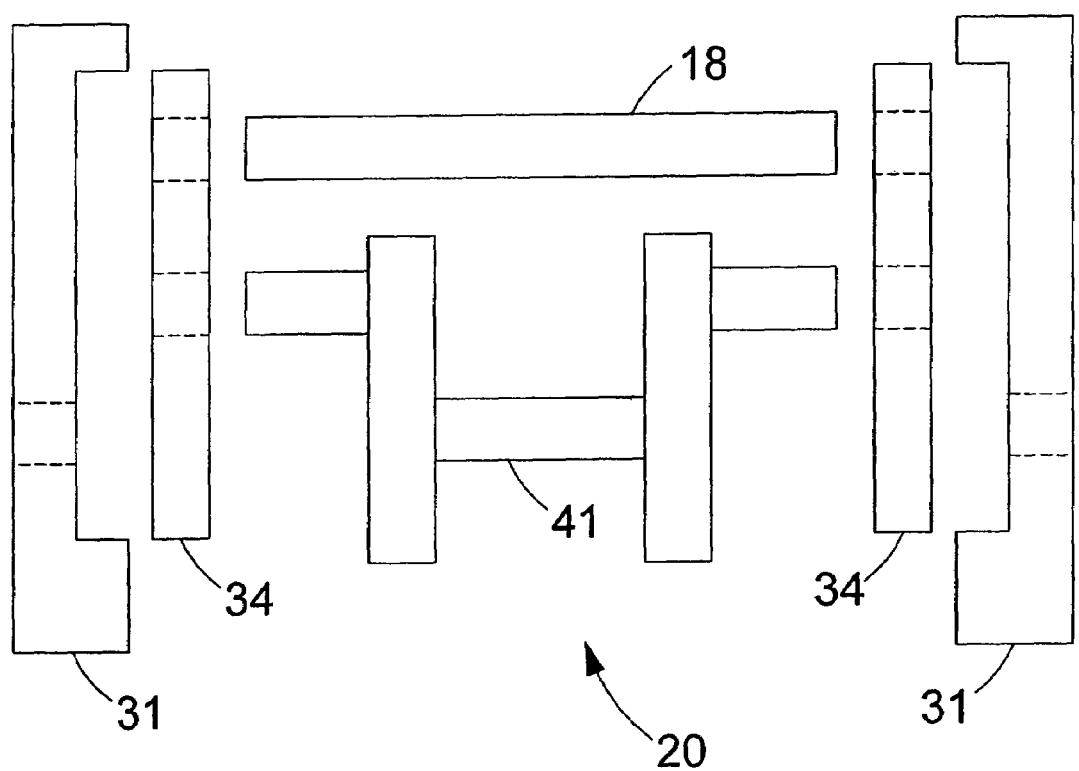
FIG. 10 is an exploded side view of the rotary member of the engine of FIG. 1.
Figure 12:
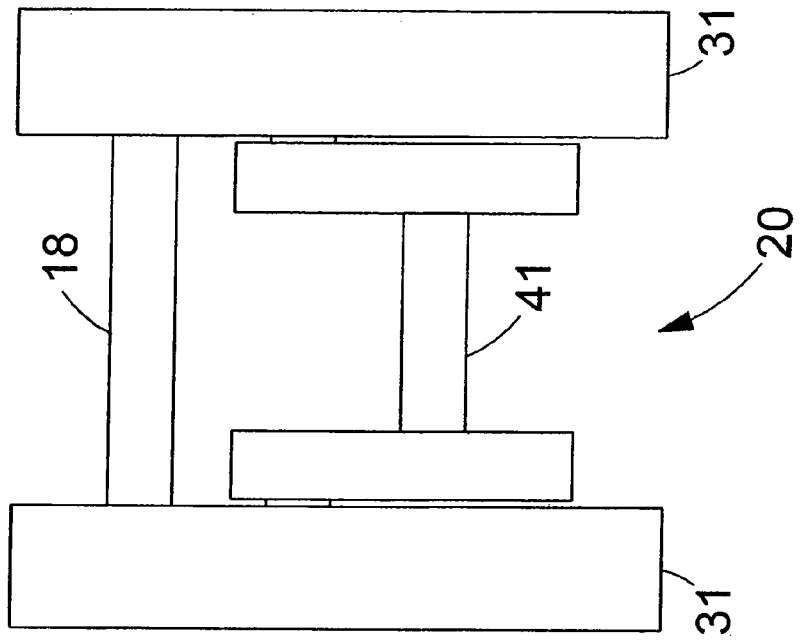
FIG. 12 is a side view of the rotary member of the engine of FIG. 1.
Figure 11:
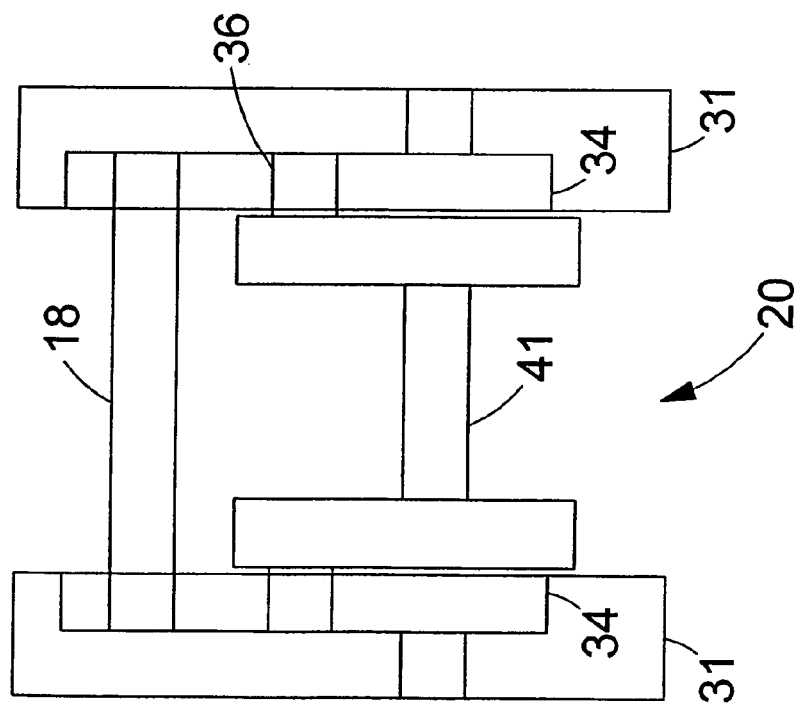
FIG. 11 is a cut-out side view diagram of the rotary member of the engine of FIG. 1.

FIG. 10 illustrates an exploded view of the rotary member assembly described with reference to FIG. 5, showing the main disc 31, inset disc 34, connectors 18 and 20, and second axis 36. The connector 20 includes a cross bar 41 that rotates about the second axis 36 but within the rectangular aperture 25 of the piston 14 described with reference to FIGS. 3 and 4. FIG. 11 shows a cut-out view of the rotary member assembly and FIG. 12 shows a side view of the rotary member assembly including the connectors 18 and 20.

Figure 19:
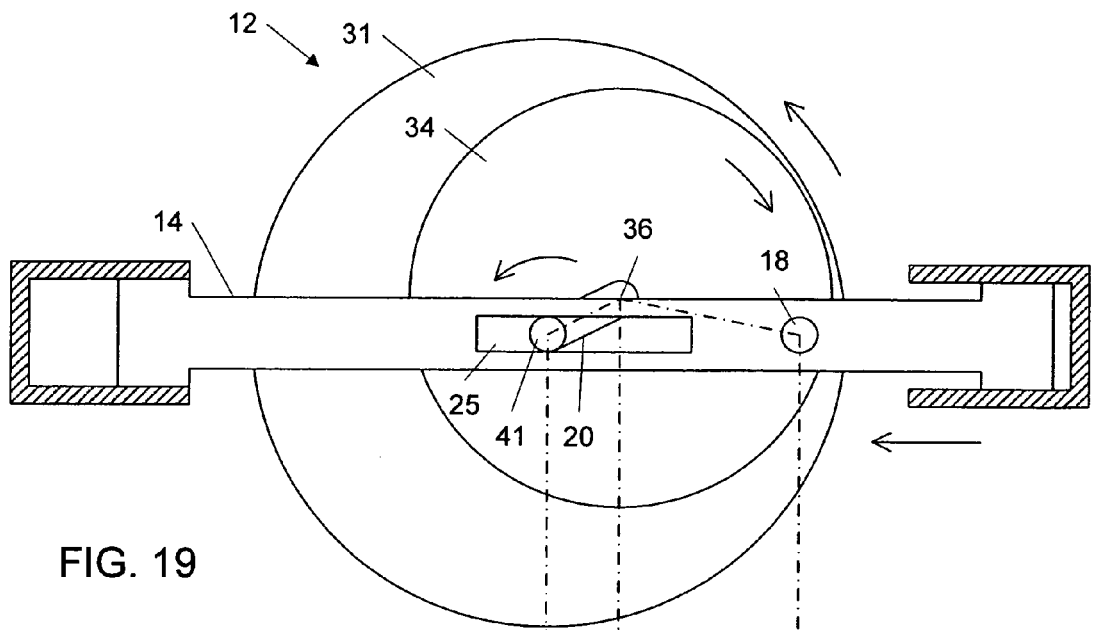
FIG. 19 is a side view of the rotary member of the engine of FIG. 1.
Figure 20:
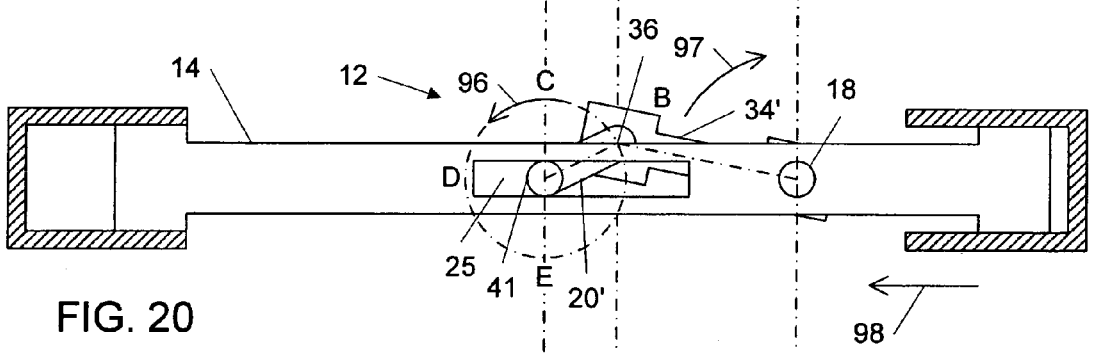
FIG. 20 is a sectional side view of the rotary member of FIG. 13.
Figure 21:
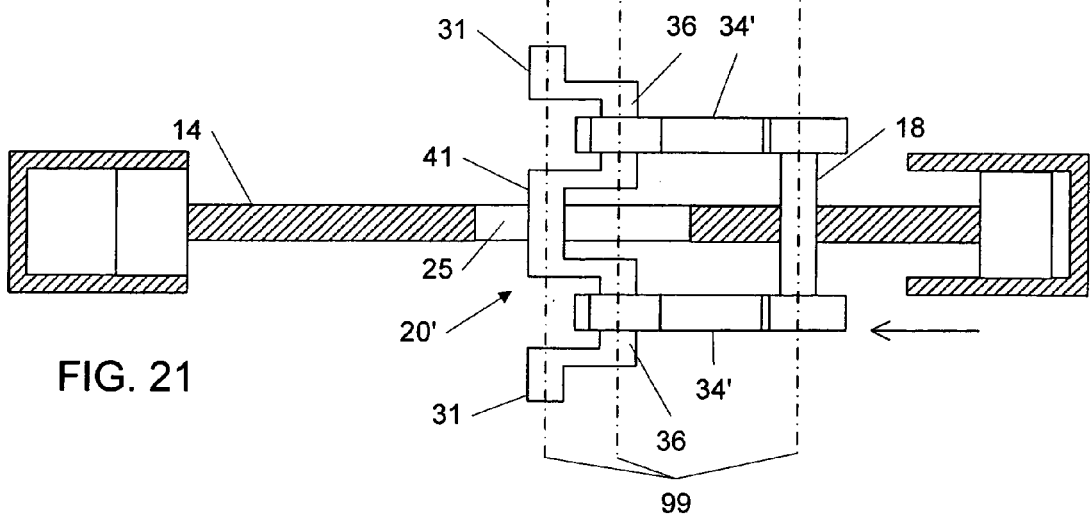
FIG. 21 is a sectional top view of the rotary member of FIG. 13.

FIGS. 19–21 further illustrate the operation and movement of portion 10 described with reference to FIGS. 1–12. FIG. 19 shows a side view diagram of the rotary member assembly described with reference to FIGS. 6–9. FIG. 20 illustrates a sectional side view of the rotary member assembly of FIG. 19. FIG. 21 illustrates a sectional top view of the rotary member assembly of FIG. 19. The rotary member assembly shown in FIGS. 20 and 21 is mechanically equivalent to the rotary members 12 shown in FIG. 19.

The dashed centerlines 99 show how the views in FIGS. 20 and 21 relate to the exemplary embodiment in FIG. 19. For example, the inset disc 34 in FIG. 19 is equivalent to rods 34' in FIGS. 20 and 21. The centerlines 99 that trace through the connector 18 and the second axis 36 show that the inset disc 34 and the rods 34' are mechanically equivalent. Likewise, the connector 20 is the mechanical equivalent of a crank 20'.

In FIG. 20, the rotary member assembly includes the crank 20', rods 34', the connector 18, and the piston 14. The connector 18, shown in FIGS. 20 and 21, coupling the piston 14 to the rotary members 12 is attached to the rods 34' at a distance from second axis 36. The rods 34' rotate about the connector 18. The crank 20', shown in FIGS. 20 and 21, passes through the aperture 25 of the piston 14 and attaches to the rods 34' at the second axis 36. The crank 20' includes a cross bar 41 described with reference to FIGS. 20 and 21.

The motion of the rotary members of FIGS. 19–21 is now described. In FIGS. 20 and 21, the piston 14 is near its right-most position. Assuming that the piston has just begun a power stroke (of a four stroke cycle) relative to the right cylinder, the piston 14 is traveling towards the left; the second axis 36 is at point B in FIG. 20. As the piston 14 moves left (shown by arrow 98), the rods 34' are forced to rotate clockwise about connector 18 (shown by arrow 97) towards point C. The clockwise motion of rods 34' causes crank 20' to rotate counter-clockwise (shown by arrow 96). When the second axis 36 reaches point C, the force of the power stroke on piston 14 and the mechanical restriction of crank 20' cause rods 34' to rotate counter-clockwise towards point D. When the power stroke is completed, the piston 14 has reached its left-most limit and an exhaust stroke begins relative to the right chamber. The rods 34' have also traveled to their left-most limit; the second axis 36 is at point D. The momentum of the system causes the rods 34' to continue to rotate counter-clockwise; the second axis 36 moves towards point E. The crank 20' also rotates counter-clockwise. The piston 14 moves towards the right. When the second axis 36 reaches point E, the rods 34' begin to rotate clockwise while the crank 20' continues to rotate counter-clockwise. When the piston 14 has reached its right-most limit (back to point B), the rotary members 12 have completed two cycles. The rotary member assembly continues to move in this fashion as the piston 14 moves laterally back and forth between the two cylinders heads 16.

A number of advantages result from the design and operation described with reference to FIGS. 1–12. For example, the design provides balanced movement and uniform speed of rotary elements of different diameters. Further, the design provides an increase in the periods of active movement of constituent parts compared to conventional rotary transmissions. Another advantage is that the speed of the linear movement of the piston 14 is equalized with movement in the opposite direction, enabling the production of engines with high power and high rotational speed, independent of their working volume.

Compared to conventional engines, the engine described herein benefits from a simplified piston assembly, a balanced rotary motion that reduces torsion and vibration, a reduction in the friction in the piston-cylinder assembly, and a reduction in thermal burden. Furthermore, the engine has the advantage of better combustion conditions due to an approximate constant speed of the piston assembly. Other benefits from the construction and design translate into greater efficiency and improved performance.

A number of uses of the engine described are possible. For example, the engine design can be used in a wide variety of motors, compressors, water turbines, gas turbines, jet engines, propellers, hydraulics, and transmission systems. For example, the design described with reference to the Figures can be used in the transmission system of a bicycle. The design can also be utilized to reduce damages from vehicle crashes because the design provides an opposite force to slow the vehicle more easily than conventional designs.

A wide range of adaptations can be made to the design described in the present application. For example, one adaptation can include two pistons positioned at angles to each other. This implementation would have four cylinders providing power, yet it would provide significant improvements over conventional four cylinder engines. Other configurations and variations can also be implemented depending on the needs of the design's use.

In performance tests conducted by the inventors, the design has provided an increase in torque many times greater than conventional systems. A person of skill in the art can represent the forces created in formulaic terms such that the performance advantages of the design described herein can be mathematically compared to known systems.

Figure 13:
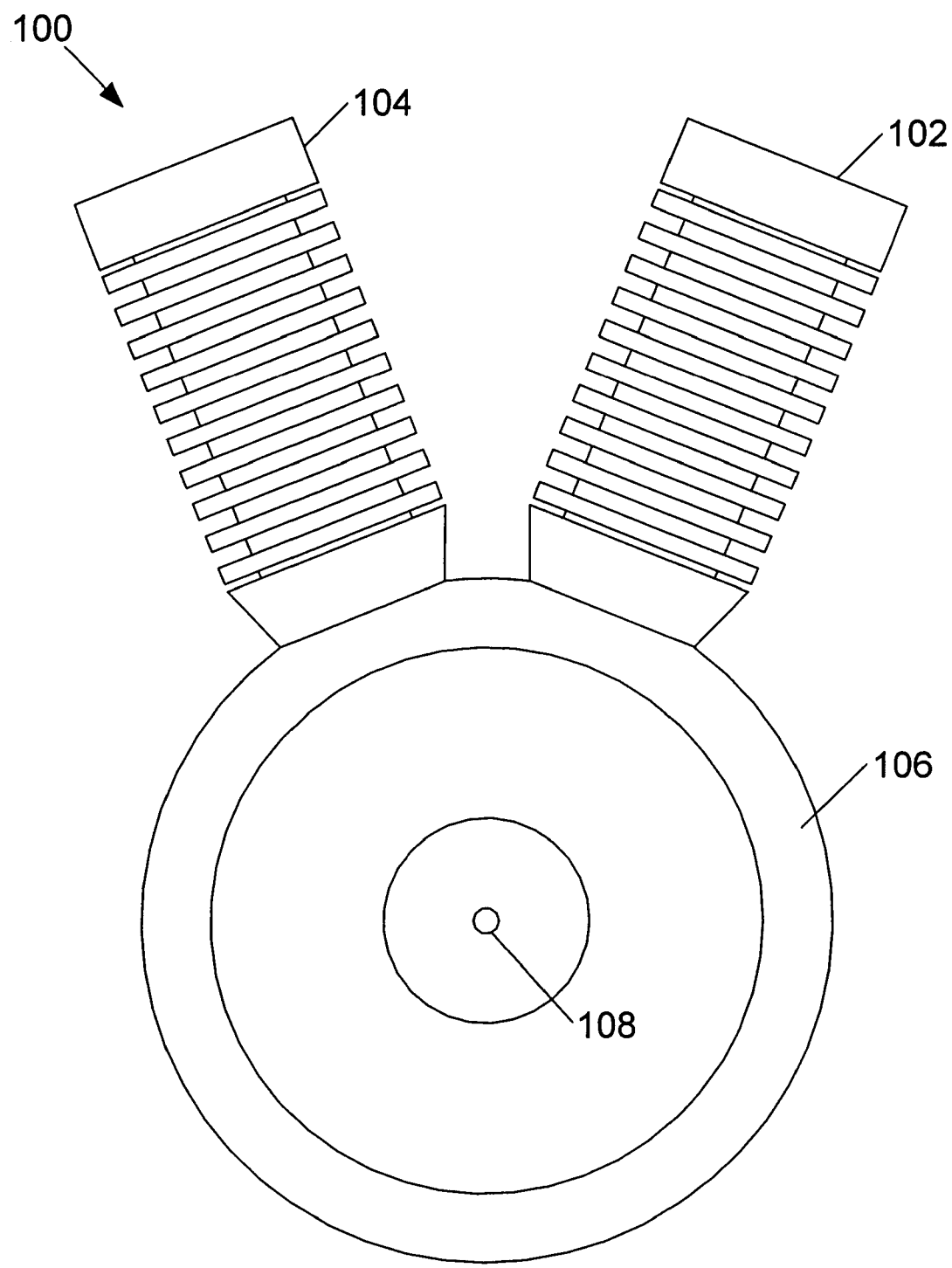
FIG. 13 is a general perspective view diagram of a v-twin engine in accordance with an exemplary embodiment.

FIG. 13 illustrates a portion 100 of a two cylinder V configuration engine in accordance with an exemplary embodiment. In alternative embodiments, the engine has a different number of cylinders, such as one or three. In the portion 100 shown in FIG. 13, cylinder head 102 and cylinder head 104 are located at angles to each other on an engine body 106. The position of cylinder heads 102 and 104 form a V shaped configuration. A driveshaft 108 is rotated when pistons contained in the cylinder heads 102 and 104 move during operation of the engine. The cylinder heads 102 and 104 can include engine head components, such as a carburetor, intake valve, exhaust valve, and other components.

Figure 14:
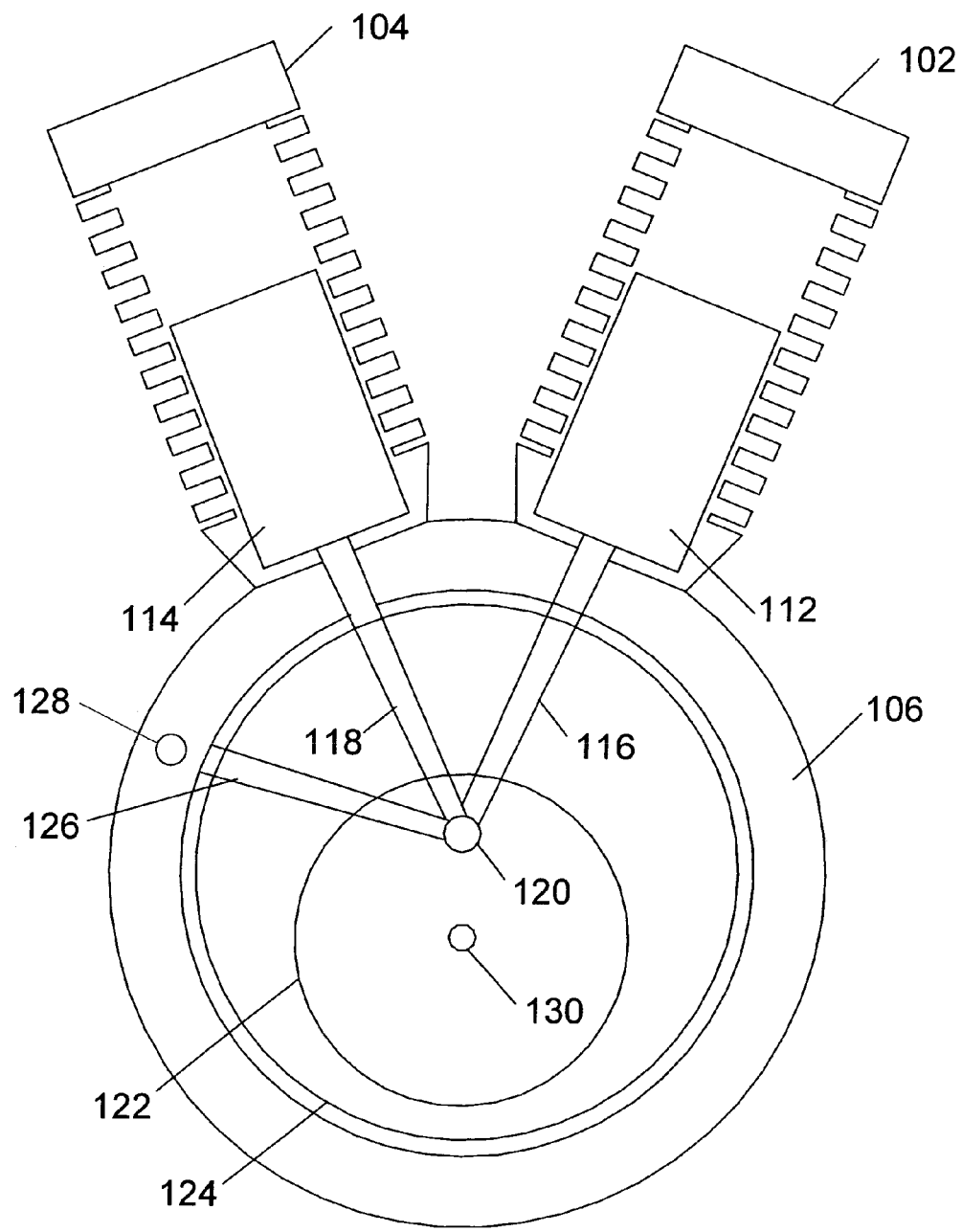
FIG. 14 is a cut-out side view diagram of the pistons and rotary member of the engine of FIG. 13 at a first position.

As illustrated in FIG. 14, a piston 112 is located within the cylinder head 102 and a piston 114 is located within the cylinder head 104. The pistons 112 and 114 move back and forth (or up and down) within the cylinder heads 102 and 104. Rods or connectors 116 and 118 couple the pistons 112 and 114 to a rotatable cross bar 120. The rotatable cross bar 120 couples connectors 116 and 118 to an inset disc 122 located within a main disc 124. The inset disc 122 and the main disc 124 are part of a rotary member assembly that rotates as a result of the movement of the pistons 112 and 114. Preferably, the rotatable cross bar 120 is fixed with relation to the inset disc 122 and rotatable with relation to connectors 116 and 118. The coupled connectors 116 and 118 are also coupled at the rotatable cross bar 120 to a balance rod 126. The balance rod 126 is attached to the engine body 106 at a point 128 on the engine body 106.

FIGS. 14–17 illustrate the movement of the rotary member assembly of the portion 100 as the pistons 112 and 114 move. In FIG. 14, the pistons 112 and 114 are at the lowest position within the cylinder heads 102 and 104. The inset disc 122 is located at the bottom end of the main disc 124 or end of main disc 124 opposite the cylinder heads 102 and 104. When the inset disc 122 is in this position, the balance rod 126 is located at an angle below horizontal relative to the point 128 on the engine body 106.

Figure 15:
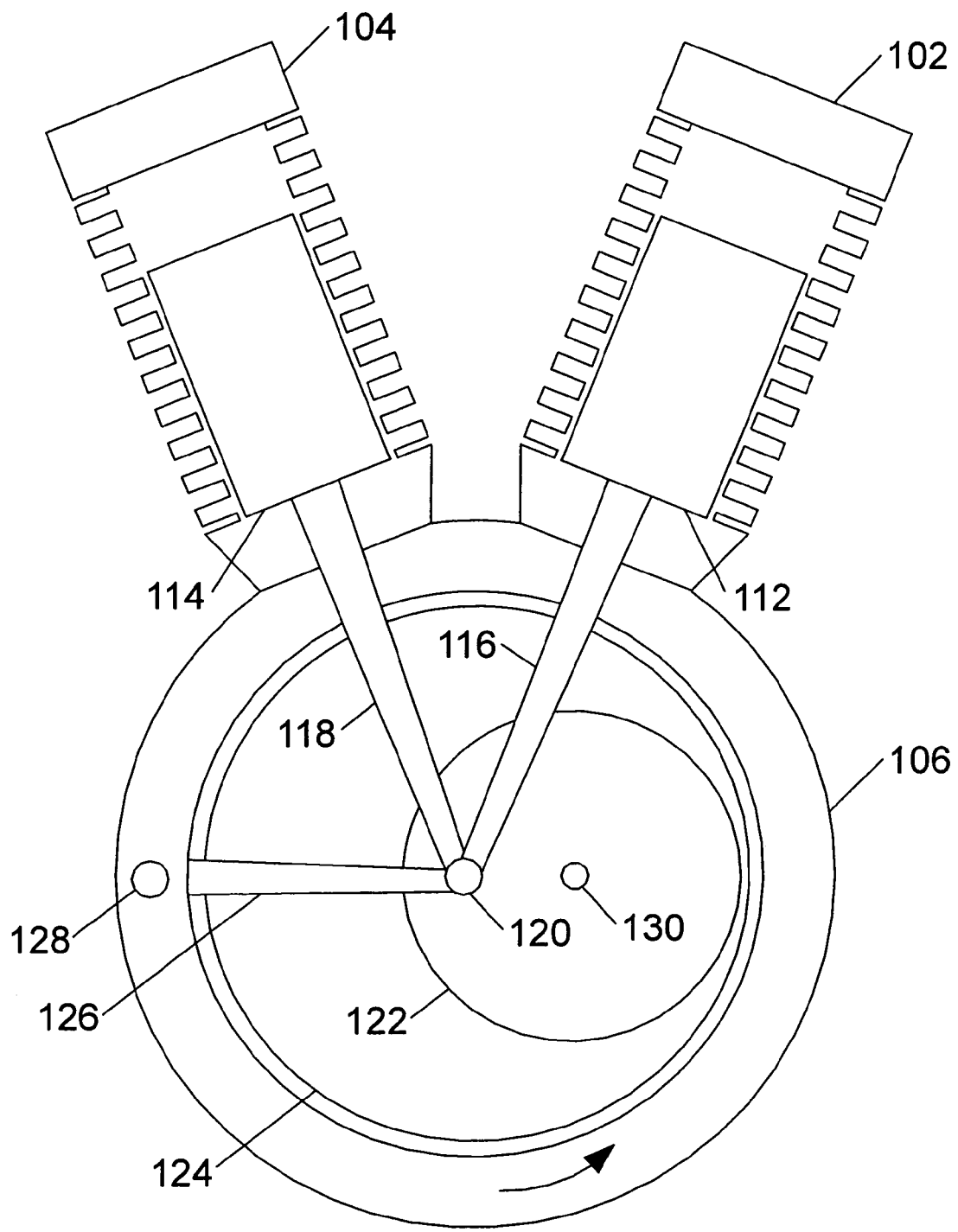
FIG. 15 is a cut-out side view diagram of the pistons and rotary member of the engine of FIG. 13 at a second position.

In FIG. 15, the pistons 112 and 114 are located at a higher position than in FIG. 14, approximately in the middle of the cylinder heads 102 and 104. The inset disc 122 is located at a right side of the main disc 124. When the inset disc 122 is in this position, the balance rod 126 is located at a horizontal position relative to the point 128 on the engine body 106.

Figure 16:
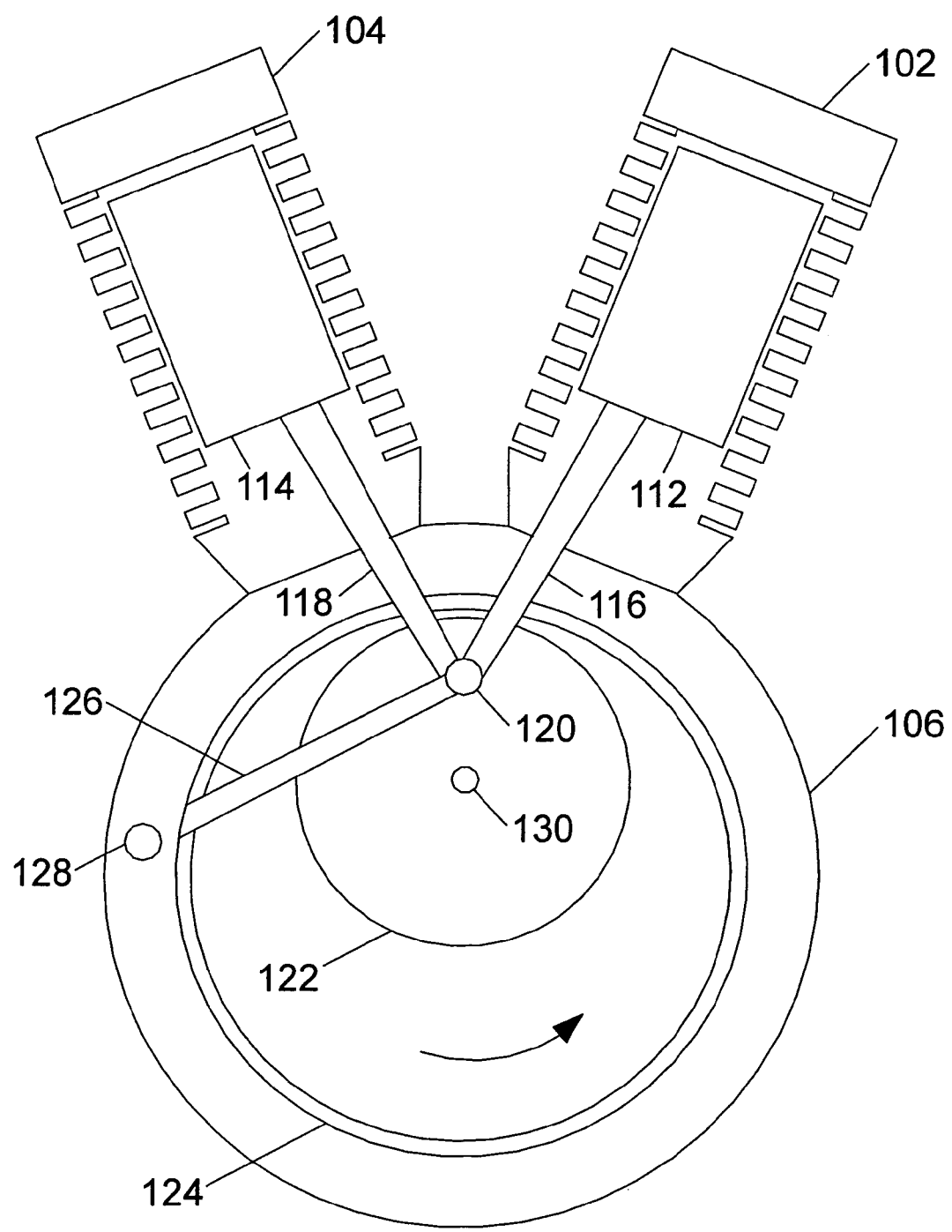
FIG. 16 is a cut-out side view diagram of the pistons and rotary member of the engine of FIG. 13 at a third position.

In FIG. 16, the pistons 112 and 114 are located at a highest position, within the cylinder heads 102 and 104. The inset disc 122 is located at a top end of the main disc 124 or the end of the main disc 124 closest to the cylinder heads 102 and 104. When the inset disc 122 is in this position, the balance rod 126 is located at an above horizontal position relative to the point 128 on the engine body 106.

Figure 17:
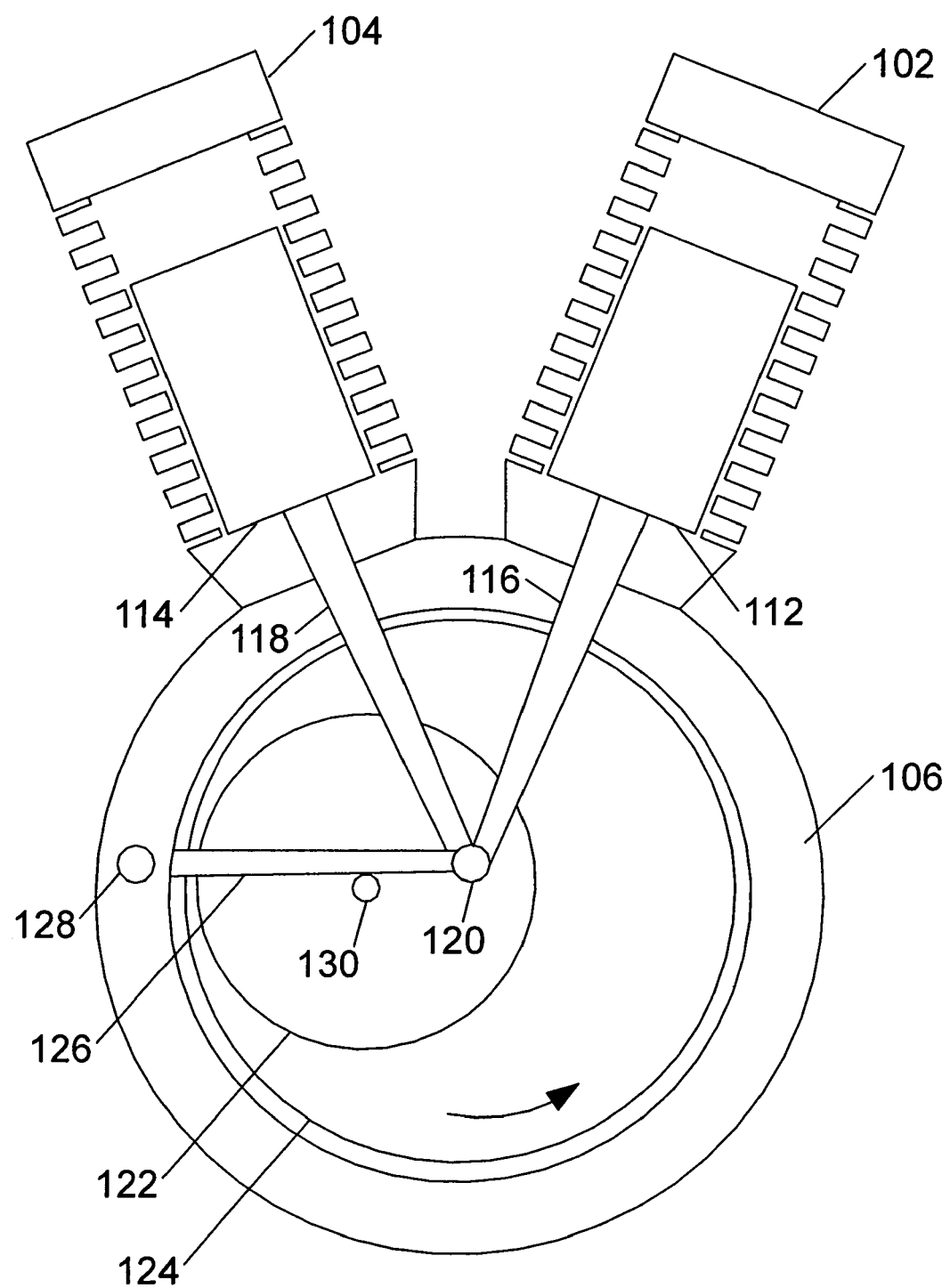
FIG. 17 is a cut-out side view diagram of the pistons and rotary member of the engine of FIG. 13 at a fourth position.

In FIG. 17, the pistons 112 and 114 are located at a lower position that in FIG. 16, approximately in the middle of the cylinder heads 102 and 104. The inset disc 122 is located at a left side of the main disc 124. When the inset disc 122 is in this position, the balance rod 126 is located at a horizontal position relative to the fixed point 128 on the engine body 106.

Figure 18:
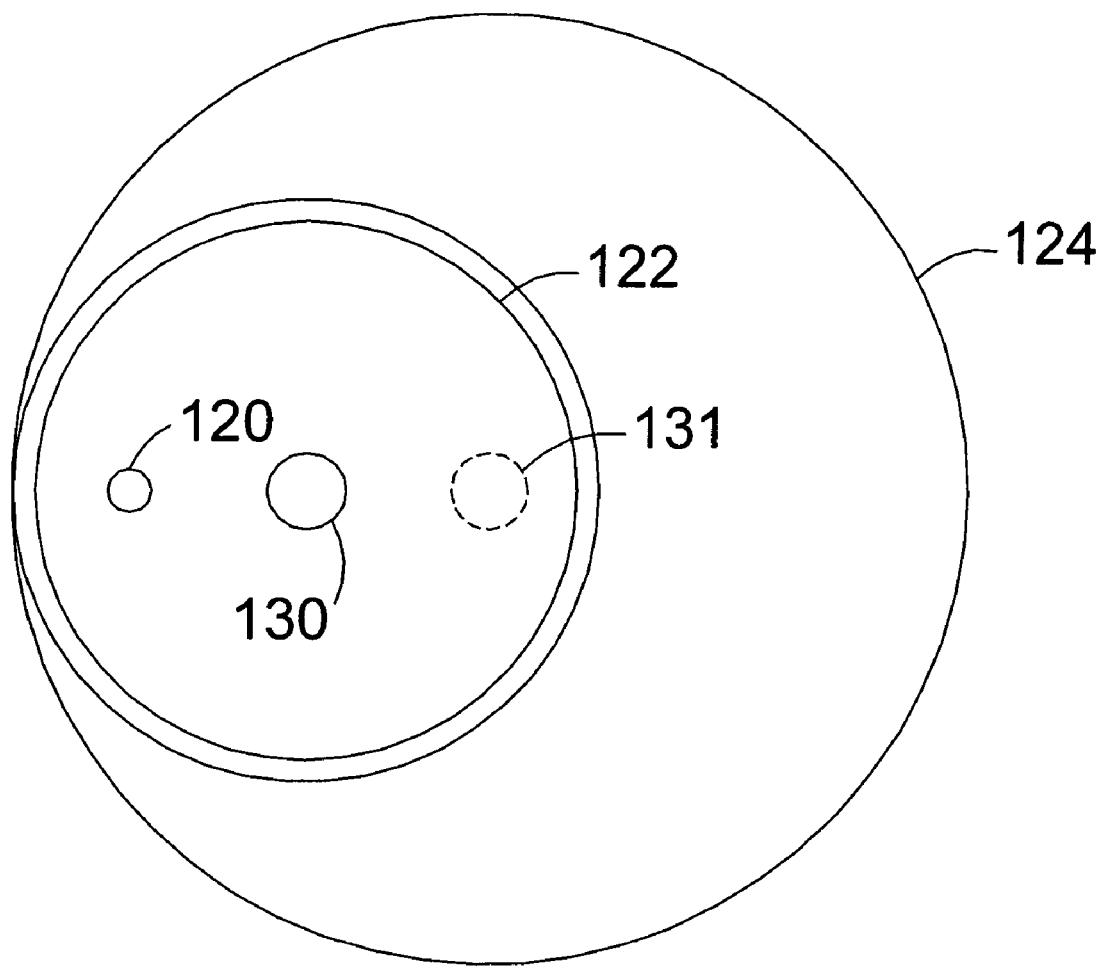
FIG. 18 is a side view diagram of a rotary member of the engine of FIG. 13.

FIG. 18 illustrates the rotary member assembly including the inset disc 122 and the main disc 124. As can be seen, the rotary member assembly of FIG. 18 is comparable to the rotary member assembly described with reference to FIG. 5. The inset disc 122 is positioned in a cut out section of the main disc 124 and rotates about a second axis 130. The main disc 124 rotates about a first axis 131. In an alternative embodiment, the inset disc 122 is not inside a cut out of the main disc 124 but is coupled to the surface of the main disc 124. The embodiment with the inset disc 122 is generally preferred to achieve a balance of masses in the assembly. The connectors 116 and 118 shown in FIGS. 14–17 coupling the pistons 112 and 114 to the rotary members are attached to the inset disc 122 at a distance from the axis of the inset disc 122 (second axis 130).

In operation, combustion of fuel and air occurs in one or both of the cylinder heads 102 and 104. When combustion occurs in both of the cylinder heads 102 and 104, the combustions are preferably synchronized using a timing circuit or some other means to have the combustions happen at the same time. Generally, this combustion occurs when the pistons 112 and 114 are at their highest point within the cylinder heads 102 and 104. At this point, the volume of air between the top of the pistons 112 and 114 and the cylinder heads 102 and 104 is at its smallest. This combustion creates a force on the pistons 112 and 114 to move towards the opposite ends of the cylinder heads 102 and 104. The lateral movement of pistons 112 and 114 is translated into the rotary motion of inset disc 122 and main disc 124. This rotary motion causes the driveshaft 108 to turn.

While several embodiments of the invention have been described, it is to be understood that modifications and changes will occur to those skilled in the art to which the invention pertains. For example, although particular embodiments and implementations described contemplate particular configurations and dimensions, other designs and sizes may also include the functionalities described herein. Moreover, while the exemplary embodiments are described using one piston as an example, multiple pistons can also be used. The invention is not limited to a particular embodiment, but extends to various modifications, combinations, and permutations that nevertheless fall within the scope and spirit of the appended claims.

The invention claimed is:

1. An engine comprising:
    a rotary member including a first axis about which the rotary member rotates, the rotary member further including a second axis coupling the rotary member to an offset rotary element;
    a first linear member coupled to the offset rotary element by a first coupling; and
    a second linear member coupled at one end to the offset rotary element by the first coupling and at an opposite end to a fixed housing, wherein the first linear member moves back and forth in lateral fashion from a first position to a second position, the lateral movement of the first linear member causing continuous rotational movement of the rotary member in one direction.

2. The engine of claim 1, wherein the offset rotary element is located inside a cutout of the rotary member.

3. The engine of claim 1, further comprising a third linear member coupled to the offset rotary element and positioned at an angle relative to the first linear member to form a V shape.

4. The engine of claim 3, wherein the first and third linear members are pistons having cylindrical ends, the cylindrical ends being positioned in combustion chambers.

5. The engine of claim 4, wherein the combustion chambers house fuel and air and provide a spark to ignite the fuel and air.

6. The engine of claim 4, wherein the combustion chambers house air which is compressed by movement of the pistons and fuel is injected causing an ignition between the compressed air and injected fuel.

7. The engine of claim 3, wherein the first linear member and the third linear member move within separate cylindrical chambers in a synchronized fashion.

8. The engine of claim 1, further comprising a third linear member coupled to the offset rotary element and positioned in a linear relationship with the first linear member.

9. A system for transferring linear motion into rotational motion, the system comprising:
    a piston moving linearly; and
    a wheel having a rotating disc rotatably connected to one side of the wheel, the rotating disc being coupled to the piston by an axis point located a first distance from a center point of the rotating disc, such that the rotating disc moves as a result of the movement of the piston, and the movement of the rotating disc causes the wheel to rotate.

10. The system of claim 9, wherein rotating disc is located within a recessed cut out of the wheel.

11. The system of claim 9, further comprising a second piston moving linearly, the second piston being coupled to the rotating disc at the axis point.

12. The system of claim 11, wherein the piston and the second piston are located at a V shaped angle to each other.

13. The system of claim 11, further comprising a balance rod having one end located at a housing and an opposite end located at the axis point.

14. The system of claim 13, further comprising a timing circuit that sets two power sources to deliver force to the piston and the second piston in a synchronized fashion.

15. The system of claim 11, wherein the piston and the second piston are located in a common plane.

* * * * *

UNITED STATES PATENT AND TRADEMARK OFFICE
CERTIFICATE OF CORRECTION

PATENT NO.        : 7,210,446 B2                                            Page 1 of 1
APPLICATION NO.   : 10/959883
DATED             : May 1, 2007
INVENTOR(S)       : Tihomir Sic and Miladin Vidakovic It is certified that error appears in the above-identified patent and that said Letters Patent is hereby corrected as shown below:

On the title page, item [56]:

On Page 1: Under References Cited insert --International Search Report dated April 7, 2006 for PCT/IB2005/002931--.

Signed and Sealed this

Nineteenth Day of January, 2010

David J. Kappos
*Director of the United States Patent and Trademark Office*